US012608451B2

(12) United States Patent
Fang et al.

(10) Patent No.: US 12,608,451 B2
(45) Date of Patent: Apr. 21, 2026

(54) METHOD OF PROCESSING ENCRYPTED IMAGE WATERMARKING, APPARATUS AND DISPLAY DEVICE

(71) Applicant: BOE TECHNOLOGY GROUP CO., LTD., Beijing (CN)

(72) Inventors: Hao Fang, Beijing (CN); Yanhong Wu, Beijing (CN); Guannan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 307 days.

(21) Appl. No.: 18/270,881

(22) PCT Filed: Aug. 24, 2022

(86) PCT No.: PCT/CN2022/114549
§ 371 (c)(1),
(2) Date: Jul. 5, 2023

(87) PCT Pub. No.: WO2024/040474
PCT Pub. Date: Feb. 29, 2024

(65) Prior Publication Data
US 2024/0378269 A1     Nov. 14, 2024

(51) Int. Cl.
*G06F 21/16* (2013.01)
*G06T 1/00* (2006.01)

(52) U.S. Cl.
CPC ............ *G06F 21/16* (2013.01); *G06T 1/0021* (2013.01)

(58) Field of Classification Search
CPC ..... G06T 1/0021; G06T 1/005; H04N 19/467; G06F 21/16; G06K 19/0065; G06K 19/06046
See application file for complete search history.

(56) References Cited

U.S. PATENT DOCUMENTS

| | | | | |
|---|---|---|---|---|
| 6,513,118 B1 * | 1/2003 | Iwamura | ............ | H04N 1/32272 705/75 |
| 7,184,552 B2 * | 2/2007 | Okuda | ................... | G11B 27/34 386/E9.017 |
| 7,515,180 B2 * | 4/2009 | Wada | ................. | H04N 1/00151 348/231.2 |
| 7,916,328 B2 * | 3/2011 | Miyamura | ............... | H04N 1/44 358/1.14 |

(Continued)

FOREIGN PATENT DOCUMENTS

| | | |
|---|---|---|
| CN | 107240060 A | 10/2017 |
| CN | 110335189 A | 10/2019 |

(Continued)

*Primary Examiner* — Hosuk Song
(74) *Attorney, Agent, or Firm* — WHDA, LLP

(57) ABSTRACT

A method of processing encrypted image watermarking, an apparatus and a display device are provided, which relates to the field of digital watermarking. The method includes: obtaining a device code of a display device and current time information, where the device code uniquely identifies the display device; generating, according to a preset encryption algorithm by using the current time information and the device code, a digital security mark; and displaying the digital security mark in a preset display area of the display device. The technical solution of the present disclosure can prevent the screen from being photographed without permission.

17 Claims, 2 Drawing Sheets

Obtaining a device code of a display device and current time information, the device code uniquely identifying the display device — 101

Generating, according to a preset encryption algorithm by using the current time information and the device code, a digital anti-counterfeiting mark — 102

Displaying the digital anti-counterfeiting mark in a preset display area of the display device — 103

(56) References Cited

U.S. PATENT DOCUMENTS

| | | | |
|---|---|---|---|
| 9,094,204 B2 * | 7/2015 | Nakagata | ............ G06F 21/6272 |
| 10,432,618 B1 * | 10/2019 | Poder | .................. H04L 63/0861 |
| 11,019,407 B2 * | 5/2021 | Revital | ............. H04N 21/8358 |
| 11,283,956 B2 * | 3/2022 | Zakharov | ........... H04N 1/32144 |
| 11,297,272 B2 * | 4/2022 | Onozawa | ................ H10F 39/12 |
| 11,557,016 B2 * | 1/2023 | Li | ......................... G06T 1/0028 |
| 11,704,389 B2 * | 7/2023 | Deaver | ................... G06F 21/12 |
| | | | 726/30 |
| 2018/0152290 A1 | 5/2018 | Jiang et al. | |

FOREIGN PATENT DOCUMENTS

| | | |
|---|---|---|
| CN | 113379582 A | 9/2021 |
| WO | 2017/016447 A1 | 2/2017 |

* cited by examiner

1

2

3

4

5

1010011010101110010111001111101011 10 ——— 6

| Obtaining module | 31 | Processing module | 32 | Display module | 33 |

METHOD OF PROCESSING ENCRYPTED IMAGE WATERMARKING, APPARATUS AND DISPLAY DEVICE

CROSS-REFERENCE TO RELATED APPLICATIONS

The present application is the U.S. national phase of PCT Application No. PCT/CN2022/114549 filed on Aug. 24, 2022, the disclosure of which is hereby incorporated by reference in its entirety.

TECHNICAL FIELD

The present disclosure relates to the technical field of digital watermarking, and in particular, to a method of processing encrypted image watermarking, an apparatus and a display device.

BACKGROUND

With the developing and application of network technology, the logistics technology and digital products, there is an increasing need for the digital watermarking technology, which has become an effective method for protecting information security, and realizing anti-counterfeiting traceability and copyright protection. By using the digital watermarking technology, certain identification information (namely, a digital watermarking) is directly embedded into a digital medium (including an image, an audio, a video, a document, and the like) or the identification information is indirectly represented (by modifying a structure of a particular area). The digital watermarking technology does not affect the use value of the original medium, and is also not easy to be ascertained and modified again, but can be recognized and identified by the producer. Through the information hidden in the medium, the content creator or purchaser can be identified, secret information can be transmitted and whether the medium has been tampered can be determined.

SUMMARY

The present disclosure is to provide a method and an apparatus for processing encrypted image watermarking, which can prevent the screen from being photographed without permission.

To achieve the above, embodiments of the present disclosure provide the following technical solutions.

In an aspect, a method of processing encrypted image watermarking is provided, including:

obtaining a device code of a display device and current time information, where the device code uniquely identifies the display device;

generating, according to a preset encryption algorithm by using the current time information and the device code, a digital security mark; and displaying the digital security mark in a preset display area of the display device.

In some embodiments, the method further includes:

obtaining an image which is obtained by photographing the display device;

extracting the digital security mark from a preset area of the image, the preset area corresponding to a preset display area of the display device; and decrypting the digital security mark by using the encryption algorithm to obtain the device code of the display device and time information for photographing the image.

In some embodiments, the device code of the display device includes at least one of a physical address and a serial number of the display device.

In some embodiments, the preset display area is located at the outermost N loops of pixels of a display screen of the display device, wherein N is a positive integer.

In some embodiments, N is 1.

In some embodiments, the generating, according to a preset encryption algorithm by using the current time information and the device code, a digital security mark, and displaying the digital security mark in a preset display area of the display device, includes:

generating a transparent image having the same resolution as that of the display screen of the display device, wherein the resolution of the transparent image remains unchanged during displaying of the display device;

generating a two-dimensional code image by invoking a two-dimensional code generation function with the current time information and the device code as inputs;

encoding the two-dimensional code image by traversing all pixels of the two-dimensional code image in an order from left to right and from top to bottom, to obtain digital security information, where a black pixel is encoded with 0, and a white pixel is encoded with 1; and obtaining encoded pixels by using the digital security information, traversing the outermost N loops of pixels of the transparent image from an upper left corner of the transparent image to right, from top to bottom, from right to left and from bottom to top, and replacing the traversed original pixels of the transparent image with the encoded pixels; and outputting the transparent image.

In some embodiments, the extracting the digital security mark from a preset area of the image, and decrypting the digital security mark by using the encryption algorithm, includes:

determining a first area in the image where a display screen of the display device is located;

traversing the outermost N loops of pixels of the first area from an upper left corner of the first area to right, from top to bottom, from right to left and from bottom to top, and reading the pixels;

generating a two-dimensional code for decryption by filling the read pixels into a two-dimensional code area in an order from left to right and from top to bottom, wherein a pixel having a grayscale lower than a first threshold is decoded as black, a pixel having a grayscale higher than or equal to the first threshold is decoded as white, and redundant pixels are discarded; and reading information of the two-dimensional code for decryption by invoking a two-dimensional code extraction function.

An embodiment of the present disclosure further provides an apparatus for processing encrypted image watermarking, including:

an obtaining module, configured to obtain a device code of a display device and current time information, where the device code uniquely identifies the display device;

a processing module, configured to generate, according to a preset encryption algorithm by using the current time information and the device code, a digital security mark; and a display module, configured to display the digital security mark in a preset display area of the display device.

In some embodiments, the obtaining module is further configured to obtain an image which is obtained by photographing the display device; and the processing module is further configured to extract the digital security mark from a preset area of the image, the preset area corresponding to the preset display area of the display device; and to decrypt the digital security mark by using the encryption algorithm to obtain the device code of the display device and time information for photographing the image.

In some embodiments, the device code of the display device includes at least one of a physical address and a serial number of the display device.

In some embodiments, the preset display area is located at the outermost N loops of pixels of a display screen of the display device, wherein N is a positive integer.

In some embodiments, the processing module is specifically configured to generate a transparent image having the same resolution as that of the display screen of the display device, where the resolution of the transparent image remains unchanged during displaying of the display device; to generate a two-dimensional code image by invoking a two-dimensional code generation function with the current time information and the device code as inputs; to encode the two-dimensional code image by traversing all pixels of the two-dimensional code image in an order from left to right and from top to bottom, so as to obtain digital security information, where a black pixel is encoded with 0, and a white pixel is encoded with 1; to obtain encoded pixels by using the digital security information, traverse the outermost N loops of pixels of the transparent image from an upper left corner of the transparent image to right, from top to bottom, from right to left and from bottom to top, and replace the traversed original pixels of the transparent image with the encoded pixels; and to output the transparent image.

In some embodiments, the processing module is specifically configured to determine a first area in the image where the display screen of the display device is located; to traverse the outermost N loops of pixels of the first area from an upper left corner of the first area to right, from top to bottom, from right to left and from bottom to top, and read the pixels; to generate a two-dimensional code for decryption by filling the read pixels into a two-dimensional code area in an order from left to right and from top to bottom, where a pixel having a grayscale lower than a first threshold is decoded as black, a pixel having a grayscale higher than or equal to the first threshold is decoded as white, and redundant pixels are discarded; and to read information of the two-dimensional code for decryption by invoking a two-dimensional code extraction function.

An embodiment of the present disclosure further provides a display device, including the apparatus for processing encrypted image watermarking as described above.

An embodiment of the present disclosure further provides an apparatus for processing encrypted image watermarking, including a processor and a memory, where the memory stores a program or an instruction executable by the processor, the program or the instruction, when being executed by the processor, implements the steps of the method as described above.

The embodiments of present disclosure have the following beneficial effects.

In the above-mentioned solution, by obtaining the device code of the display device and the current time information; generating the digital security mark according to a preset encryption algorithm by using the current time information and the device code; and displaying the digital security mark in a preset display area of the display device, if the screen content of the display device is photographed without permission in a scenario such as a conference or an office, a reverse decryption and tracing can be performed on the image photographed without permission, to obtain time information about photographing the image and the device code of the display device on which the image is displayed, which may be helpful in finding the person taking such an image.

DETAILED DESCRIPTION

To give a clear illustration of technical issues to be addressed, technical solutions, and advantages of embodiments of the present disclosure t, a detailed description will be given hereinafter with reference to the accompanying drawings and specific embodiments.

The embodiments of the present disclosure provide a method and an apparatus for processing encrypted image watermarking and, which can prevent the screen from being photographed without permission.

Figure 1:
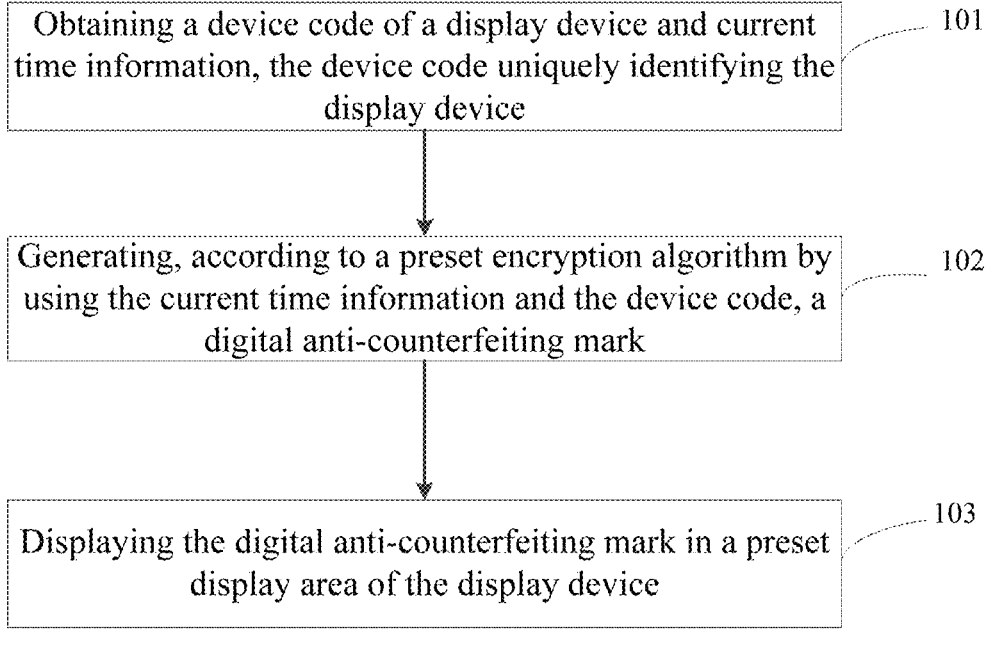
FIG. 1 is a schematic flow chart of a method of processing encrypted image watermarking according to an embodiment of the present disclosure.

An embodiment of the present disclosure provides a method of processing encrypted image watermarking. As shown in FIG. 1, the method includes steps 101 to 103.

At step 101, a device code of a display device and current time information are obtained, where the device code uniquely identifies the display device.

In the present embodiment, the current time information may be in an accuracy of minute, such as 16:24 pm on Aug. 17, 2022. Alternatively, the accuracy for the current time information may also be in hour or second; if the current time information is in an accuracy of second, the amount of processing and calculation is large, and if the current time information is in an accuracy of hour, the traceability effect is limited. Preferably, the current time information is in the accuracy of minute. Thus, the current time information needs to be obtained every minute.

In some embodiments, the device code of the display device includes at least one of a physical address and a serial number of the display device. The serial number is a serial number of an operating system of the display device, and both the physical address and the serial number of the display device may uniquely identify the display device. The device code of the display device may include the physical address of the display device only, or the serial number of the display device only, or both the physical address and the serial number of the display device.

At step 102, a digital security mark is generated according to a preset encryption algorithm by using the current time information and the device code.

In a specific example, the step of generating the digital security mark includes: generating a transparent image having the same resolution as that of the display screen of the display device, where the resolution of the transparent image remains unchanged during displaying of the display device; generate a two-dimensional code image by invoking a two-dimensional code generation function with the current time information and the device code as inputs; traversing all pixels of the two-dimensional code image in an order from left to right and from top to bottom, so as to encoding the two-dimensional code image to obtain digital security information, where a black pixel is encoded with 0, and a white pixel is encoded with 1; obtaining encoded pixels by using the digital security information, replacing original pixels of the transparent image with the encoded pixels by traversing the outermost N loops of pixels of the transparent image, the traversing being started from an upper left corner of the transparent image, from left to right, then from top to bottom, from right to left and finally from bottom to top; and outputting the processed transparent image.

Using the two-dimensional code is to encode and protect original information on the one hand, and is to enhance the robustness of the information and thereby preventing possible noise contamination from affecting information extraction during storage and transmission of the image on the other hand.

It is also possible to traverse all pixels of the two-dimensional code image in an order from left to right and from bottom to top, or to traverse all pixels of the two-dimensional code image in an order from right to left and from bottom to top, or to traverse all pixels of the two-dimensional code image in an order from right to left and from top to bottom, as long as all the pixels of the two-dimensional code image can be traversed. The resolution of the two-dimensional code image may be preset, for example, 100*100.

After traversing all the pixels of the two-dimensional code image, the black pixels each is encoded with 0, and the white pixels each is encoded with 1, such that the digital security information, for example, 101001101010111001011100111110101110, is obtained. Encoded pixels may be obtained by using the digital security information, and the encoded pixels may include two or more types of pixels with different grayscales, for example, the encoded pixels may include two types of pixels with different grayscales, wherein a pixel with a lower grayscale represents 0 and a pixel with a higher grayscale represents 1, so that the digital security information may be represented by the encoded pixels. Alternatively, the encoded pixels include three types of pixels with different grayscales, where a pixel with the highest grayscale represents 1 and pixels with the other two grayscales represent 0, or a pixel with the lowest grayscale represents 0 and pixels with the other two grayscales represent 1, so that the digital security information may be represented by the encoded pixels. Alternatively, the encoded pixels include four types of pixels with different grayscales, where two types of pixels with the highest grayscale represent 1 and two types of pixels with the other two grayscales represent 0, or two type of pixels with the lowest grayscale represent 0, and two types of pixels with the other two grayscales represent 1, so that the digital security information may be represented by the encoded pixels.

In some embodiments, the encoded pixels may also include pixels of two or more different colors, for example, the encoded pixels include pixels of two different colors of blue and green, where a blue pixel represents 0, and a green pixel represents 1, so that digital security information may be represented by the encoded pixels. Alternatively, the encoded pixels include pixels of three different colors, where a blue pixel represents 0, and pixels of the other two colors represent 1, so that digital security information may be represented by the encoded pixels. Alternatively, the encoded pixels include pixels of four different colors, wherein blue and green pixels represent 1 and yellow and red pixels represent 0, such that the digital security information may be represented by the encoded pixels.

By replacing the outermost N loops (for example, columns and rows) of pixels of the transparent image with the encoded pixels, the digital security information can be embedded into the transparent image to form a digital security mark. In this embodiment, the digital security information is converted into binary, and then is represented by different brightness or color values between pixels, such that the encryption of the information can be done. In addition, the encoded pixels are located at the outermost side of the transparent image which may have a lower impact on the displaying of the transparent image. Among others, N may be set as required, for example, 1 or 2, etc. As an example, N is equal to 1 so that the effect on the displaying of the transparent image can be minimized.

If the quantity of the encoded pixels is less than the quantity of the outermost loop of pixels of the transparent image, the remaining pixels of the outermost loop of pixels of the transparent image may be displayed in black or other predetermined color.

When replacing the original pixels of the transparent image with the encoded pixels, the outermost N loops of pixels of the transparent image may also be traversed in the following manner: starting at an upper right corner of the transparent image, from right to left, then from top to bottom, from left to right, and finally from bottom to top. Alternatively, the outermost N loops of pixels of the transparent image may also be traversed in the following manner: starting at a lower left corner of the transparent image, from left to right, then from bottom to top, from right to left and finally from top to bottom. Alternatively, the outermost N loops of pixels of the transparent image may be traversed in the following manner: starting at a lower right corner of the transparent image, from right to left, then from bottom to top, from left to right, and finally from top to bottom. The direction for the traversing may be clockwise or counterclockwise.

At step 103, the digital security mark is displayed in a preset display area of the display device.

Specifically, the preset display area is located at the outermost N loops of pixels of a display screen of the display device, wherein N is a positive integer, for example, 1 or 2, or more. In an embodiment, N is equal to 1.

Figure 3:
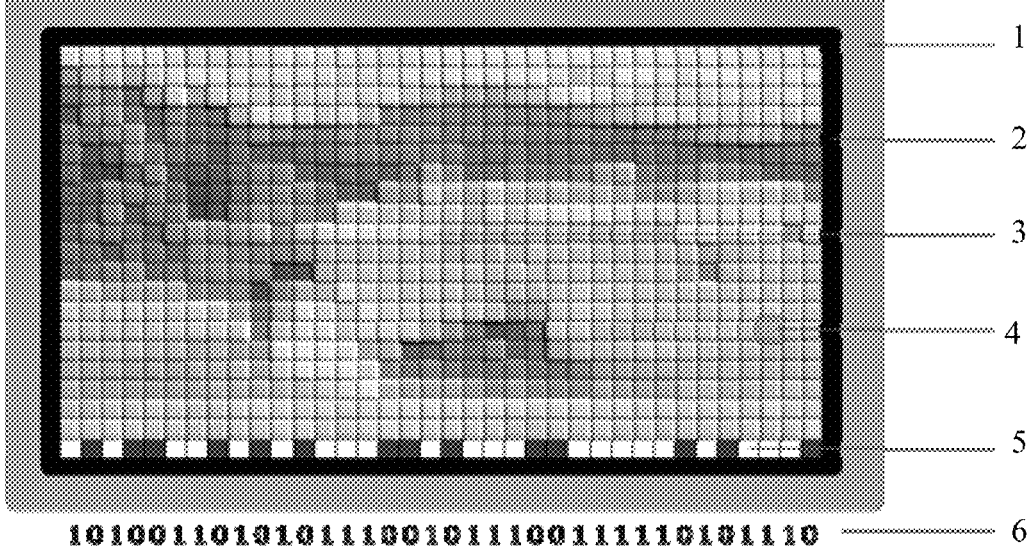
FIG. 3 is a schematic diagram showing a display device according to an embodiment of the present disclosure.

In this embodiment, in the process of normal displaying of the display device, the generated transparent image is superimposed on the screen for displaying, and the transparent image does not affect the displaying of the normal content and may serve as a hidden digital security mark. As shown in FIG. 3, numeral 1 denotes a physical structure frame of a display device, numeral 2 denotes a physical black edge of the display device, numeral 3 denotes a screen of the display device, numeral 4 denotes a single pixel in the screen of the display device, numeral 5 denotes a digital security mark, and numeral 6 denotes digital security information represented by the digital security mark. It can be seen that the digital security mark only exists on the outermost loop of pixels of the screen. In practice, the brightness of the digital security mark may be adjusted so that the brightness of the digital security mark is close to a physical black edge, so that the digital security mark may be hardly perceived by a viewer.

In this embodiment, the updating frequency of the transparent image is determined by the granularity of the current time information. When the current time information is in the accuracy of minute, the transparent image is updated every minute; when the current time information is in the accuracy of second, the transparent image is updated every second; and when the current time information is in the accuracy of hour, the transparent image is updated every hour.

Figure 2:
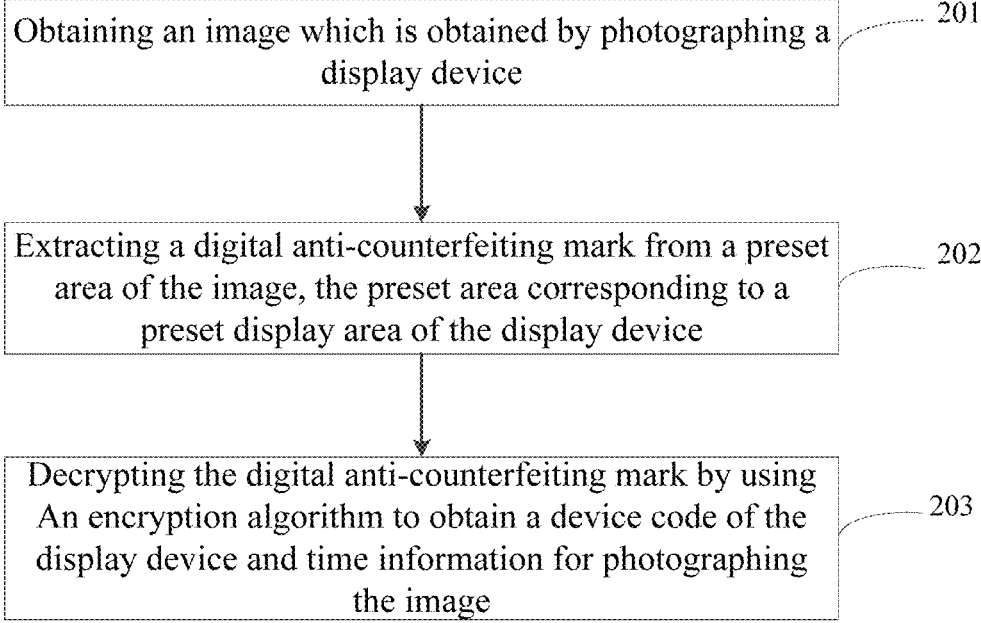
FIG. 2 is a schematic flow chart of processing an image obtained by photographing a display device according to an embodiment of the present disclosure.

With the technical solution of embodiments of this disclosure, the traceability for impermissible photographing can be achieved. As shown in FIG. 2, the method includes the following steps 201 to 203.

At step 201, an image obtained by photographing a display device is obtained.

In a scenario such as a conference or an office, if the screen content of the display device is photographed without permission, and the image photographed without permission may be published at the network, through which such an image may be obtained.

At step 202, a digital security mark is extracted from a preset area of the image, the preset area corresponding to a preset display area of the display device.

Since the digital security mark is only displayed in the preset display area of the display device, the preset area corresponding to the preset display area needs to be determined, and the digital security mark is extracted from the preset area.

At step 203, the digital security mark is decrypted by using the encryption algorithm to obtain a device code of the display device and time information for photographing the image.

In some embodiments, the extracting a digital security mark from a preset area of the image, and decrypting the digital security mark by using the encryption algorithm, includes: determining a first area in the image where the display screen of the display device is located; traversing the outermost N loops of pixels of the first area in the following manner: starting at an upper left corner of the first area, from left to right, then from top to bottom, from right to left and finally from bottom to top, and reading the traversed pixels; generating a two-dimensional code for decryption by filling the read pixels into a two-dimensional code area in an order from left to right and from top to bottom, where a pixel having a grayscale lower than a first threshold is decoded as black (of a two-dimensional code), a pixel having a grayscale higher than or equal to the first threshold is decoded as white (of a two-dimensional code), and redundant pixels are discarded; and reading information of the two-dimensional code for decryption by invoking a two-dimensional code extraction function.

The order of traversing the outermost N loops of pixels of the first area is consistent with the order of replacing the original pixels of the transparent image with the encoded pixels to output the processed transparent image. For example, the outermost N loops of pixels of the first area may be traversed in the following manner: starting at an upper left corner of the first area, from left to right, then from top to bottom, from right to left and finally from bottom to top. Alternatively, the outermost N loops of pixels of the first area may be traversed in the following manner: starting at a upper right corner of the first area, from right to left, then from top to bottom, from left to right, and finally from bottom to top. Alternatively, the outermost N loops of pixels of the first area may be traversed in the following manner: starting at a lower left corner of the first area, from left to right, then from bottom to top, from right to left and finally from top to bottom. Alternatively, the outermost N loops of pixels of the first area may be traversed in the following manner: starting at a lower right corner of the first area, then from left to right, from top to bottom, from right to left and finally from bottom to top.

The read pixels may include two types of pixels with different grayscales, where a pixel with a lower grayscale is decoded as black, and a pixel with a higher grayscale is decoded as white. Alternatively, the read pixels include three types of pixels with different grayscales, where a pixel with the highest grayscale is decoded as white, and pixels with the other two grayscales are decoded as black. Alternatively, the read pixels include four types of pixels with different grayscales, where two types of pixels with the highest grayscales are decoded as white and the remaining two types of pixels are decoded as black.

The read pixels may also include pixels of two or more different colors, for example, the read pixels include pixels of two different colors including blue and green, where a blue pixel is decoded as black and a green pixel is decoded as white. Alternatively, the read pixels include pixels of three different colors, where a blue pixel is decoded as black, and pixels of the other two colors are decoded as white. Alternatively, the read pixels include pixels of four different colors, wherein blue and green pixels are decoded as black, and yellow and red pixels are decoded as white.

The read pixels are filled into a two-dimensional code area in an order of from left to right and from top to bottom. It is also possible to fill the read pixels into the two-dimensional code area in an order from left to right and from bottom to top, or to fill the read pixels into the two-dimensional code area in an order from right to left and from bottom to top, or to fill the read pixels into the two-dimensional code area in an order from right to left and from top to bottom. The order in which the read pixels are filled into the two-dimensional code area is consistent with the order in which all the pixels of the two-dimensional code image are traversed in step 102.

A two-dimensional code extraction function is invoked to read information of the two-dimensional code for decryption, so as to obtain the device code of the display device photographed in the image and time information when photographing the image. A position where the display device is located may be positioned with the device code of the display device. Persons who are present at that position may be determined with the time information when photographing the image. As such, a person who took the image without permission can be determined and subjected to legal responsibility, thereby prevent such an impermissible photographing event from occurring again.

In the embodiments, by obtaining the device code of the display device and the current time information; generating the digital security mark according to a preset encryption algorithm by using the current time information and the device code; and displaying the digital security mark in a preset display area of the display device, if the screen content of the display device is photographed without permission in a scenario such as a conference or an office, a reverse decryption and tracing can be performed on the image photographed without permission, to obtain time information on when the image is photographed and the device code of the display device which the image is directed to, which may be helpful in finding the person taking such an image.

Figure 4:
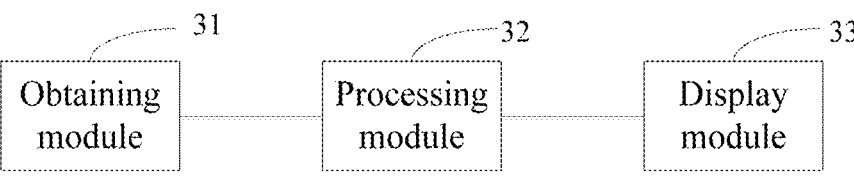
FIG. 4 is a block diagram of an apparatus for processing encrypted image watermarking according to an embodiment of the present disclosure.

An embodiment of the present disclosure further provides an apparatus for processing encrypted image watermarking. As shown in FIG. 4, The apparatus includes an obtaining module 31.

The obtaining module 31 is configured to obtain a device code of a display device and current time information, where the device code uniquely identifies the display device.

In the present embodiment, the current time information may be accurate to minute, such as 16:24 pm on Aug. 17, 2022. Alternatively, the current time information may also be accurate to hour or second. If the current time information is accurate to second, the amount of processing and calculation is large, and if the current time information is accurate to hour, the effect of security traceability is limited. Preferably, the current time information is accurate to minute. Thus, the current time information needs to be obtained every minute.

In some embodiments, the device code of the display device includes at least one of a physical address and a serial number of the display device, the serial number is a serial number of an operating system of the display device, and each of the physical address and the serial number of the display device may uniquely identify the display device. The device code of the display device may include the physical address of the display device only, or the serial number of the display device only, or both the physical address and the serial number of the display device.

The apparatus further includes a processing module 32, configured to generate a digital security mark according to a preset encryption algorithm by using the current time information and the device code.

In some embodiments, the processing module 32 is specifically configured to generate a transparent image having the same resolution as that of the display screen of the display device, where the resolution of the transparent image remains unchanged during displaying of the display device. The processing module 32 is further configured to generate a two-dimensional code image by invoking a two-dimensional code generation function with the current time information and the device code as inputs. The processing module 32 is further configured to encode the two-dimensional code image by traversing all pixels of the two-dimensional code image in an order from left to right and from top to bottom, so as to obtain digital security information, where a black pixel is encoded with 0, and a white pixel is encoded with 1. The processing module 32 is further configured to obtain encoded pixels by using the digital security information; to traverse the outermost N loops of pixels of the transparent image in the following manner: starting at an upper left corner of the transparent image, from left to right, then from top to bottom, from right to left and from bottom to top; and to replace traversed original pixels of the transparent image with the encoded pixels; and to output the processed transparent image.

By using the two-dimensional code, original information can be is to encode and protected, meanwhile the robustness of the information can be improved thereby preventing possible noise contamination during storage and transmission from affecting information extraction.

It may be possible to traverse all the pixels of the two-dimensional code image in an order from left to right and from bottom to top, or to traverse all the pixels of the two-dimensional code image in an order from right to left and from bottom to top, or to traverse all the pixels of the two-dimensional code image in an order from right to left and from top to bottom, as long as all the pixels of the two-dimensional code image may be traversed. The resolution of the two-dimensional code image may be preset, for example, 100*100.

After traversing all the pixels of the two-dimensional code image, a black pixel is encoded with 0, and a white pixel is encoded with 1, such that the digital security information, for example, 10100110101011100101110011110101110, may be obtained. Encoded pixels may be obtained by using the digital security information, and the encoded pixels may include two or more types of pixels with different grayscales. For example, the encoded pixels may include two types of pixels with different grayscales, where a pixel with a lower grayscale represents 0, and a pixel with a higher grayscale represents 1, so that the digital security information may be represented by the encoded pixels. Alternatively, the encoded pixels include three types of pixels with different grayscales, where the pixel with the highest grayscale represents 1 and pixels with the other two grayscales represent 0, or the pixel with the lowest grayscale represents 0 and the pixels with the other two grayscales represent 1, so that the digital security information may be represented by the encoded pixels. Alternatively, the encoded pixels include four types of pixels with different grayscales, wherein two types pf pixels with the highest grayscales represent 1 and the other two types of pixels with other grayscales represent 0, or two types pf pixels with the highest grayscales represent 0 and the other two types of pixels with other grayscales represent 1, so that the digital security information may be represented by the encoded pixels.

In some embodiments, the encoded pixels may also include two or more types of pixels with different colors. For example, the encoded pixels include two types of pixels with two different colors including blue and green, where a blue pixel represents 0, and a green pixel represents 1, so that the digital security information may be represented by the encoded pixels. Alternatively, the encoded pixels include three types of pixels with three different colors, where a blue pixel represents 0, and pixels with the other two colors represent 1, so that digital security information may be represented by the encoded pixels. Alternatively, the encoded pixels include four types of pixels with four different colors, where blue and green pixels represent 1 and yellow and red pixels represent 0, such that the digital security information is represented by the encoded pixels.

The outermost N loops of pixels of the transparent image are replaced with the encoded pixels, i.e., the digital security information is embedded into the transparent image to form a digital security mark. In the embodiments, the digital security information is converted into binary, and then is represented by different brightness values or colors between pixels, such that the encryption of the information is done. In addition, the encoded pixels are located at the outermost side of the transparent image, which may have a minimal impact on the displaying of the transparent image. N may be set according to actual need, for example, 1 or 2. In an embodiment, N is equal to 1, so that the effect on the displaying of the transparent image can be minimized.

If the quantity of the encoded pixels is less than the quantity of the outermost loop of pixels of the transparent image, the remaining pixels of the outermost loop of pixels of the transparent image may be displayed in black or other predetermined color.

When replacing the original pixels of the transparent image with the encoded pixels, the outermost N loops of pixels of the transparent image may also be traversed in the following manner: starting from an upper right corner of the transparent image, then from right to left, from top to bottom, from left to right, and from bottom to top. Alternatively, the outermost N loops of pixels of the transparent image may also be traversed in the following manner: starting at a lower left corner of the transparent image, from left to right, then from bottom to top, from right to left, and from top to bottom. Alternatively, the outermost N loops of pixels of the transparent image may be traversed in the following manner: starting at a lower right corner of the transparent image, then from right to left, from bottom to top, from left to right, and from bottom to top. The direction of traversing may be clockwise or counterclockwise.

The apparatus further includes a display module 33, configured to display the digital security mark in a preset display area of the display device.

Specifically, the preset display area is located at the outermost N loops of pixels of a display screen of the display device, where N is a positive integer, for example, 1 or 2. In an embodiment, N is equal to 1.

In this embodiment, in the normal displaying process of the display device, the generated transparent image is superimposed on the screen for displaying, and the transparent image does not affect the displaying of normal content and may be used to display a hidden digital security mark. As shown in FIG. 3, numeral 1 denotes a physical structure frame of a display device, numeral 2 denotes a physical black edge of the display device, numeral 3 denotes a screen of the display device, numeral 4 denotes a single pixel in the screen of the display device, numeral 5 denotes a digital security mark, and numeral 6 denotes digital security information represented by the digital security mark. It can be seen that the digital security mark only exists on the outermost loop of pixels of the screen. In practice, the brightness of the digital security mark may be adjusted so that the brightness of the digital security mark is close to a physical black edge, and thus the digital security mark may be hardly perceived by a viewer.

In this embodiment, an updating frequency of the transparent image is determined by a granularity of the current time information. When the current time information is accurate to a minute, the transparent image is updated every minute. When the current time information is accurate to a second, the transparent image is updated every second. When the current time information is accurate to an hour, the transparent image is updated every hour.

With the technical solution of embodiments of this disclosure, the traceability for impermissible photographing can be achieved. In some embodiments, the obtaining module 31 is further configured to obtain an image which is obtained by photographing a display device;

In a scenario such as a conference or an office, if the screen content of the display device is photographed without permission, and the image photographed without permission may be published at the network, through which such an image may be obtained.

The processing module 32 is further configured to extract a digital security mark from a preset area of the image, the preset area corresponding to a preset display area of the display device; and to decrypt the digital security mark by using the encryption algorithm to obtain a device code of the display device and time information for photographing the image.

Since the digital security mark is only displayed in the preset display area of the display device, the preset area corresponding to the preset display area needs to be determined, and the digital security mark is extracted from the preset area In some embodiments, the processing module 32 is specifically configured to determine a first area in the image where a display screen of the display device is located. The processing module 32 is further configured to traverse the outermost N loops of pixels of the first area in the following manner: starting at an upper left corner of the first area, from left to right, then from top to bottom, from right to left and finally from bottom to top, and to reading the traversed pixels. The processing module 32 is further configured to generate a two-dimensional code for decryption by filling the read pixels into a two-dimensional code area in an order from left to right and from top to bottom, where a pixel grayscale lower than a first threshold is decoded as black, a pixel grayscale higher than or equal to the first threshold is decoded as white, and redundant pixels are discarded. The processing module 32 is further configured to read information of the two-dimensional code for decryption by invoking a two-dimensional code extraction function.

The order of traversing the outermost N loops of pixels of the first area is consistent with the order of replacing the original pixels of the transparent image with the encoded pixels to output the processed transparent image. For example, the outermost N loops of pixels of the first area may be traversed in the following manner: starting at an upper left corner of the first area, from left to right, then from top to bottom, from right to left and from bottom to top. Alternatively, the outermost N loops of pixels of the first area may be traversed in the following manner: starting at an upper right corner of the first area, from right to left, then from top to bottom, from left to right, and from bottom to top. Alternatively, the outermost N loops of pixels of the first area may be traversed in the following manner: starting at a lower left corner of the first area, from left to right, then from bottom to top, from right to left, and from top to bottom. Alternatively, the outermost N loops of pixels of the first area may be traversed in the following manner: starting at a lower right corner of the first area, then from left to right, from top to bottom, from right to left and f from bottom to top.

The read pixels may include two types of pixels with different grayscales, where a pixel with a lower grayscale is decoded as black, and a pixel with a higher grayscale is decoded as white. Alternatively, the read pixels include three types of pixels with different grayscales, where a pixel with the highest grayscale is decoded as white, and pixels with the other two grayscales are decoded as black. Alternatively, the read pixels include four types of pixels with different grayscales, where two types of pixels with the highest grayscales are decoded as white and the remaining two types of pixels are decoded as black.

The read pixels may also include two or more types of pixels of two or more different colors. For example, the read pixels include two o types of pixels of two different colors including blue and green, where a blue pixel is decoded as black and a green pixel is decoded as white. Alternatively, the read pixels include three types of pixels of three different colors, where a blue pixel is decoded as black, and pixels of the other two colors are decoded as white. Alternatively, the read pixels include four types of pixels of four different colors, wherein blue and green pixels are decoded as black, and yellow and red pixels are decoded as white.

The read pixels are filled into a two-dimensional code area in an order of from left to right and from top to bottom. It is also possible to fill the read pixels into the two-dimensional code area in an order from left to right and from bottom to top, or to fill the read pixels into the two-dimensional code area in an order from right to left and from bottom to top, or to fill the read pixels into the two-dimensional code area in an order from right to left and from top to bottom. The order in which the read pixels are filled into the two-dimensional code area is consistent with the order in which all the pixels of the two-dimensional code image are traversed in step 102.

A two-dimensional code extraction function is invoked to read information of the two-dimensional code for decryption, so as to obtain the device code of the display device photographed in the image and time information when photographing the image. A position where the display device is located may be positioned with the device code of the display device. Persons who are present at that position may be determined with the time information when photographing the image. As such, a person who took the image without permission can be determined and subjected to legal responsibility, thereby prevent such an impermissible photographing event from occurring again.

An embodiment of the present disclosure further provides a display device, including the apparatus for processing encrypted image watermarking as described above.

An embodiment of the present disclosure further provides an apparatus for processing encrypted image watermarking, including a processor and a memory, the memory stores thereon a program or an instruction executable by the processor, the program or the instruction, when being executed by the processor, implements the steps of the method as described above.

In the various method embodiments of the present disclosure, the serial number of each step is not used to define the order of each step. A change in the order of the steps, which would be readily conceived by those skilled in the art without involving any creative effort, falls within the scope of the present disclosure.

It should be noted that, the terms "comprise", "include" or any other variation thereof as used herein, are intended to cover a non-exclusive inclusion, such that a process, method, article, or apparatus that comprises a list of elements does not include only those elements but may include other elements not expressly listed or inherent to such process, method, article, or apparatus. Unless specified otherwise, an element defined by "comprises a . . . " does not preclude additional identical elements to be included in the process, method, article, or apparatus that comprises the element. Furthermore, it should be noted that the scope of the method and apparatus in the embodiments of the present application is not limited to the order as shown or discussed for performing the functions. The functions may be performed in a substantially simultaneous manner or in a reverse order depending on the functionality involved. For example, the method may be performed in a different order than described and various steps may be added, omitted, or combined. In addition, features described with reference to certain examples may be combined in other examples.

From the description of the embodiments given above, it will be clear to a person skilled in the art that the method of the embodiments described above may be implemented by means of software in conjunction with a necessary general purpose hardware platform, which may be a better embodiment in many cases, or may also be implemented by means of hardware. Based on such an understanding, the technical solution of the present application, in essence or in part contributing to the prior art, can be embodied in a form of a computer software product stored in a non-transitory machine-readable storage medium (such as a ROM/RAM, a magnetic disk, an optical disk), including an instruction for causing a terminal (which can be a mobile phone, a computer, a server, an air conditioner, or a network device, etc.) to implement the method according to various embodiments of the present application.

Although the embodiments of the present application have been described above with reference to the accompanying drawings, the present application is not limited to the above-mentioned specific embodiments. The above-mentioned specific embodiments are merely illustrative rather than restrictive. Various changes can made by those skilled in the art with the inspiration from the present application, without departing from the spirit and scope of the present application and the appended claims, and those changes fall within the scope of the present application.

What is claimed is:

1. A method of processing encrypted image watermarking, comprising:
   obtaining a device code of a display device and current time information, wherein the device code uniquely identifies the display device;
   generating, according to a preset encryption algorithm by using the current time information and the device code, a digital security mark; and
   displaying the digital security mark in a preset display area of the display device;
   wherein the generating, according to a preset encryption algorithm by using the current time information and the device code, a digital security mark, and displaying the digital security mark in a preset display area of the display device, comprises:
   generating a transparent image having the same resolution as that of the display screen of the display device, wherein the resolution of the transparent image remains unchanged during displaying of the display device;
   generating a two-dimensional code image by invoking a two-dimensional code generation function with the current time information and the device code as inputs;
   encoding the two-dimensional code image by traversing all pixels of the two-dimensional code image in an order from left to right and from top to bottom, so as to obtain digital security information, wherein a black pixel is encoded with 0, and a white pixel is encoded with 1;
   obtaining encoded pixels by using the digital security information, traversing the outermost N loops of pixels of the transparent image in the following manner: starting at an upper left corner of the transparent image, then from left to right, from top to bottom, from right to left and from bottom to top, and replacing the traversed original pixels of the transparent image with the encoded pixels; and
   outputting the transparent image.

2. The method according to claim 1, further comprising:
   obtaining an image which is obtained by photographing the display device;
   extracting the digital security mark from a preset area of the image, the preset area corresponding to the preset display area of the display device; and
   decrypting the digital security mark by using the encryption algorithm to obtain the device code of the display device and time information for photographing the image.

3. The method according to claim 2, wherein the preset display area is located at the outermost N loops of pixels in a display screen of the display device, wherein N is a positive integer.

4. The method according to claim 3, wherein the extracting the digital security mark from a preset area of the image, and decrypting the digital security mark by using the encryption algorithm, comprises:

determining a first area in the image where the display screen of the display device is located;

traversing, from an upper left corner of the first area to right, from top to bottom, from right to left and from bottom to top, the outermost N loops of pixels of the first area and reading the pixels;

generating a two-dimensional code for decryption by filling the read pixels into a two-dimensional code area in an order from left to right and from top to bottom, wherein a pixel having a grayscale lower than a first threshold is decoded as black, a pixel having a grayscale higher than or equal to the first threshold is decoded as white, and redundant pixels are discarded; and reading information of the two-dimensional code for decryption by invoking a two-dimensional code extraction function.

5. The method according to claim 1, wherein the device code of the display device comprises at least one of a physical address or a serial number of the display device.

6. The method according to claim 3, wherein N is 1.

7. An apparatus for processing encrypted image watermarking, comprising a processor and a memory, wherein the memory stores an instruction executable by the processor, the instruction, when being executed by the processor, implements:

obtaining a device code of a display device and current time information, wherein the device code uniquely identifies the display device;

generating, according to a preset encryption algorithm by using the current time information and the device code, a digital security mark; and displaying the digital security mark in a preset display area of the display device;

wherein the generating, according to a preset encryption algorithm by using the current time information and the device code, a digital security mark, and displaying the digital security mark in a preset display area of the display device, comprises:

generating a transparent image having the same resolution as that of the display screen of the display device, wherein the resolution of the transparent image remains unchanged during displaying of the display device;

generating a two-dimensional code image by invoking a two-dimensional code generation function with the current time information and the device code as inputs;

encoding the two-dimensional code image by traversing all pixels of the two-dimensional code image in an order from left to right and from top to bottom, so as to obtain digital security information, wherein a black pixel is encoded with 0, and a white pixel is encoded with 1;

obtaining encoded pixels by using the digital security information, traversing the outermost N loops of pixels of the transparent image in the following manner: starting at an upper left corner of the transparent image, then from left to right, from top to bottom, from right to left and from bottom to top, and replacing the traversed original pixels of the transparent image with the encoded pixels; and outputting the transparent image.

8. The apparatus according to claim 7, the instruction, when being executed by the processor, further implements:

obtaining an image which is obtained by photographing the display device;

extracting the digital security mark from a preset area of the image, the preset area corresponding to the preset display area of the display device; and decrypting the digital security mark by using the encryption algorithm to obtain the device code of the display device and time information for photographing the image.

9. The apparatus according to claim 8, wherein the preset display area is located at the outermost N loops of pixels in a display screen of the display device, wherein N is a positive integer.

10. The apparatus according to claim 9, wherein N is 1.

11. The apparatus according to claim 9, wherein the extracting the digital security mark from a preset area of the image, and decrypting the digital security mark by using the encryption algorithm, comprises:

determining a first area in the image where the display screen of the display device is located;

traversing, from an upper left corner of the first area to right, from top to bottom, from right to left and from bottom to top, the outermost N loops of pixels of the first area and reading the pixels;

generating a two-dimensional code for decryption by filling the read pixels into a two-dimensional code area in an order from left to right and from top to bottom, wherein a pixel having a grayscale lower than a first threshold is decoded as black, a pixel having a grayscale higher than or equal to the first threshold is decoded as white, and redundant pixels are discarded; and reading information of the two-dimensional code for decryption by invoking a two-dimensional code extraction function.

12. The apparatus according to claim 7, wherein the device code of the display device comprises at least one of a physical address or a serial number of the display device.

13. A non-transitory machine-readable storage medium, storing an instruction executable by the processor, the instruction, when being executed by the processor, implements:

obtaining a device code of a display device and current time information, wherein the device code uniquely identifies the display device;

generating, according to a preset encryption algorithm by using the current time information and the device code, a digital security mark; and displaying the digital security mark in a preset display area of the display device;

wherein the generating, according to a preset encryption algorithm by using the current time information and the device code, a digital security mark, and displaying the digital security mark in a preset display area of the display device, comprises:

generating a transparent image having the same resolution as that of the display screen of the display device, wherein the resolution of the transparent image remains unchanged during displaying of the display device;

generating a two-dimensional code image by invoking a two-dimensional code generation function with the current time information and the device code as inputs;

encoding the two-dimensional code image by traversing all pixels of the two-dimensional code image in an order from left to right and from top to bottom, so as to obtain digital security information, wherein a black pixel is encoded with 0, and a white pixel is encoded with 1;

obtaining encoded pixels by using the digital security information, traversing the outermost N loops of pixels of the transparent image in the following manner: starting at an upper left corner of the transparent image, then from left to right, from top to bottom, from right to left and from bottom to top, and replacing the traversed original pixels of the transparent image with the encoded pixels; and outputting the transparent image.

14. The storage medium according to claim 13, the instruction, when being executed by the processor, further implements:

obtaining an image which is obtained by photographing the display device;

extracting the digital security mark from a preset area of the image, the preset area corresponding to the preset display area of the display device; and decrypting the digital security mark by using the encryption algorithm to obtain the device code of the display device and time information for photographing the image.

15. The storage medium according to claim 14, wherein the preset display area is located at the outermost N loops of pixels in a display screen of the display device, wherein N is a positive integer.

16. The storage medium according to claim 15, wherein the extracting the digital security mark from a preset area of the image, and decrypting the digital security mark by using the encryption algorithm, comprises:

determining a first area in the image where the display screen of the display device is located;

traversing, from an upper left corner of the first area to right, from top to bottom, from right to left and from bottom to top, the outermost N loops of pixels of the first area and reading the pixels;

generating a two-dimensional code for decryption by filling the read pixels into a two-dimensional code area in an order from left to right and from top to bottom, wherein a pixel having a grayscale lower than a first threshold is decoded as black, a pixel having a grayscale higher than or equal to the first threshold is decoded as white, and redundant pixels are discarded; and reading information of the two-dimensional code for decryption by invoking a two-dimensional code extraction function.

17. The storage medium according to claim 13, wherein the device code of the display device comprises at least one of a physical address or a serial number of the display device.

\* \* \* \* \*